(12) United States Patent
Wötting et al.

(10) Patent No.: US 6,395,661 B2
(45) Date of Patent: *May 28, 2002

(54) SINTERED SILICON NITRIDE, COMPONENTS MADE THEREWITH, SPECIALLY VALVES, METHODS FOR THE PRODUCTION AND USE THEREOF

(75) Inventors: Gerhard Wötting, Coburg; Ernst Gugel; Hans Andreas Lindner, both of Rödental; Peter Woditsch, Krefeld, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 81 days.

(21) Appl. No.: 09/402,403
(22) PCT Filed: Mar. 27, 1998
(86) PCT No.: PCT/EP98/01816
§ 371 (c)(1),
(2), (4) Date: Nov. 22, 1999
(87) PCT Pub. No.: WO98/45226
PCT Pub. Date: Oct. 15, 1998

(30) Foreign Application Priority Data
Apr. 9, 1997 (DE) .......................... 197 14 708

(51) Int. Cl.$^7$ ............................................. C04B 35/587
(52) U.S. Cl. ................... 501/97.1; 501/97.2; 501/97.3
(58) Field of Search .............................. 501/97.1, 97.2, 501/97.3

(56) References Cited

U.S. PATENT DOCUMENTS

| 4,659,680 A | * | 4/1987 | Guile ......................... 501/104 |
| 5,298,467 A | * | 3/1994 | Hurtado et al. ............... 501/90 |
| 5,384,081 A | | 1/1995 | Wötting et al. ............... 264/65 |
| 5,635,432 A | * | 6/1997 | Honda et al. ............... 501/97.1 |
| 5,776,600 A | * | 7/1998 | Katayama et al. .......... 501/97.1 |

FOREIGN PATENT DOCUMENTS

| EP | 0 753 492 | | 1/1997 |
| JP | 6-87665 | * | 3/1984 |
| WO | 94/24066 | | 10/1994 |

\* cited by examiner

Primary Examiner—Karl Group
(74) Attorney, Agent, or Firm—Joseph C. Gil; Diderico van Eyl

(57) ABSTRACT

A sintered $Si_3N_4$ material, valves and components made with the material, and methods for making same.

4 Claims, No Drawings

SINTERED SILICON NITRIDE, COMPONENTS MADE THEREWITH, SPECIALLY VALVES, METHODS FOR THE PRODUCTION AND USE THEREOF

This application is a 371 of PCT/EP98/01816 filed Mar. 27, 1998.

BACKGROUND OF THE INVENTION

The present invention relates to sintered silicon nitride ($Si_3N_4$), components made thereof, in particular valves, process for their production and their use.

Materials made of $Si_3N_4$ are of proven use in many applications. However, components made of $Si_3N_4$ still have inadequacies such as lack or reliability in continuous use, which stand in the way of wide use of $Si_3N_4$ components in the said applications, which would be advantageous economically and ecologically. For example, although DE-A 4312251 claims a high-strength $Si_3N_4$ material having a defined failure probability, no teaching is given regarding the way in which these failure probabilities are to be achieved. They are merely derived from classical flexural strength determinations and statistical evaluation thereof.

The reliability of ceramic materials is determined from short-term strength, with its spread, and from long-term behaviour under load. In this context, the short-term strength follows the Griffith relationship:

$$\sigma = \frac{K_{Ic}}{\sqrt{c}\,Y} \quad (1)$$

with:
σ Strength in MPa
$K_{Ic}$ Fracture toughness in MPa·m$^{1/2}$
c Critical crack length in μm and
Y Form factor, which describes the shape of the critical crack.

According to this relationship, the strength is directly dependent on the crack or defect length in the material.

The scatter in the short-term strength, which is important for reliability, is described by the Weibull distribution and is characterized by the Weibull modulus according to DIN 51110.

In the case of loading below the stress which leads to catastrophic fracture, however, the "v-k" concept is applicable $$v = A \cdot K^n_I \quad (2)$$

with
v Crack growth rate in m/s,
$K_I$ Stress intensity factor in MPa·m$^{1/2}$ in the case of load type l= tensile stress, and
A,n Parameters for subcritical crack growth (life).

This concept is applicable to materials and components which are exposed to varying stresses below the maximum stress, described by the Griffith relationship, which immediately leads to failure, and is therefore relevant to ceramic materials and components for a large number of technical applications, e.g. for valves in reciprocating piston engines.

The crack growth parameter is determined, according to the description of standard draft ENV 843-3 by determining flexural strengths at different loading rates.

The determination of the flexural strength is described in DIN 51 110. The loading rate employed in this case, which is intended to cause fracture in 5 to 10 s, is customarily about 100 MPa/s. The flexural strength determined in this case is referred to as short-term or inert strength $\sigma_c$.

In order to ascertain the crack growth parameter, this measurement is carried out at reduced loading rates. In this case, the cracks which are present have the opportunity to grow, with the result that fracture occurs under lower loads, i.e. so-called subcritical crack growth takes place. If the breaking stress is plotted against the loading rate on a double logarithmic scale, and the median values of the measurement carried out repeatedly for a defined loading rate are joined by a best fit line, then the crack growth parameters n and A are found from the slope of the line and the axis intercept of this line. Typical ceramic materials have n values of 30 to 40 (see Kingery, Introduction to Ceramics, John Wiley & Sons, New York, 1976, page 804) and are therefore apparently to be qualified as subcritical crack growth, so that their life in practical use is limited.

In order to satisfy increasing demands, especially in the automobile industry, a need has arisen for $Si_3N_4$ materials and components with improved reliability.

The object of the present invention was therefore to provide sintered $Si_3N_4$ and reliable components, in particular valves based on $Si_3N_4$, which have properties meeting this profile and are also straightforward and therefore inexpensive to produce.

It has unexpectedly been found that sintered $Si_3N_4$ with a particular chlorine content has improved subcritical crack growth behaviour with high flexural strength and high Weibull modulus at the same time.

DESCRIPTION OF THE INVENTION

The invention therefore relates to sintered $Si_3N_4$ which has a chlorine content of 100 to 500 ppm, a subcritical crack growth parameter n≧50, preferably ≧60, a mean flexural strength at room temperature ≧850 MPa and a Weibull modulus ≧18.

The chlorine content of the sintered $Si_3N_4$ was in this case determined by pressure digestion with hydrofluoric acid at temperatures between 100 and 120° C. and subsequent potentiometric titration of the chloride by means of silver nitrate.

The sintered $Si_3N_4$ according to the invention preferably contains alkaline earth metals, $Sc_2O_3$, $Y_2O_3$, rare earth oxides, $TiO_2$, $ZrO_2$, $HfO_2$, $B_2O_3$ and/or $Al_2O_3$ as sintering additives, these forming a secondary phase concentration in the sintered material of 7.5 to 20 vol. % in addition to crystalline $Si_3N_4$ and/or $Si_3N_4$ mixed crystals.

This secondary phase concentration is determined by ascertaining the total oxygen content of the sintered $Si_3N_4$ through hot extraction. The known oxygen concentration introduced by the added sintering aids is subtracted from this result. The difference represents the oxygen content of $Si_3N_4$ following preparation, which is assumed to be present in the form of $SiO_2$. This $SiO_2$ concentration is added to the sintering aid concentration, which represents the total proportion of oxide constituents in addition to $Si_3N_4$.

For the $Si_3N_4$ proportion in the material, its pure density of 3.18 g/cm$^3$ is employed to calculate the volume fraction, and for the secondary phases which are formed by the reaction of the sintering additives with the $SiO_2$ in the $Si_3N_4$ powder during the sintering, the pure density $\rho_R$ is calculated according to $$\rho_R = G\text{-}tot \Big/ \sum_{i=1}^{i=n} (G_i/\rho_{Ri}) \text{ in g/cm}^3 \qquad (3)$$

with
G-tot=Total weight of the oxide components in g
$G_i$=Weights of the individual oxide components in g
$\rho_{Ri}$=Pure densities of the individual oxide components in g/cm$^3$.

The volume fractions of $Si_3N_4$ and secondary phase are thereby determined, the latter being between 7.5 and 20 vol. % for the material according to the invention.

The $Si_3N_4$ according to the invention is distinguished by a high packing factor (low porosity) so that, for example, during re-sintering at a temperature up to 50° C. higher than the sintering temperature, neither the density nor the Young's modulus of the material changes.

The invention also relates to a process for preparing the sintered $Si_3N_4$ according to the invention where $Si_3N_4$ powder, which either contains chlorine in an amount of 500 to 1500 ppm or, as an alternative to this, is used together with a metal chloride, is dispersed in water together with at lest one sintering additive, mixed with organic processing aids, the aqueous slip is ground to a fineness of 90%<1 μm, and subsequently dried preferably by spray drying or fluidized bed drying so that the $Si_3N_4$ granules have a moisture content of between 1.0 and 4% by weight, preferably between 1 and 3% by weight and an average granule size of 40 to 80 μm, and these are subsequently compressed and sintering is carried out after the organic process aids have been baked out under an $N_2$ pressure of $1 \leq p \leq 10$ bar.

The compression is preferably carried out axially and/or isostatically.

In a preferred embodiment of the invention, the compression is carried out at pressures <2500 bar, the organic process aids and the moisture are baked out in air, inert gas or vacuum at $T \leq 650°$ C. and the sintering is carried out under an $N_2$ pressure of $1 \leq p \leq 10$ bar at $T \leq 2000°$ C.

Preferably, the $Si_3N_4$ powder used has a Cl content of 500 to 1500 ppm and leads in the sintered $Si_3N_4$ to a Cl content of 100 to 500 ppm.

Preferred sintering additives which can be used in the process according to the invention are alkaline earth metals, $Sc_2O_3$, $Y_2O_3$, rare earth oxides, $TiO_2$, $ZrO_2$, $HfO_2$, $B_2O_3$ and/or $Al_2O_3$.

These are preferably added in amounts such that, during the sintering, by reaction with the oxygen which is always present in $Si_3N_4$ powders, and is assumed to be in the form of $SiO_2$, a liquid phase is formed which is present in the sintered material as a predominantly vitreous secondary phase in a concentration of 7.5–20 vol. %.

Preferred organic process aids which can be used in the process according to the invention are dispersing agents and/or impression aids, the latter comprising the function of binding and plasticizing.

The dispersion agents are preferably citric and polyacrylic acid derivatives and amino alcohols in concentrations of 0.1–2.5% by weight in relation to the solids content of the slip.

A large number of substances can be used as compression aids, such as, for example, polyurethane dispersions, cellulose derivatives, starches and polysaccharides, polyamide solutions, polyvinyl alcohol and acetate, polyethylene glycols and/or stearates. These are preferably used in amounts of 0.2–5% by weight.

The compression at <2500 bar may be carried out by axial and/or isostatic dry compression, for example in a mould corresponding to the component.

The materials obtained in this way have no granule residues in the material structure. Reproducible strengths in excess of 850 MPa with Weibull moduli $\geq 18$ are therefore obtained.

The invention also relates to components, especially valves, made of the $Si_3N_4$ according to the invention.

The present invention furthermore also relates to valves with a failure probability of less than $10^{-6}$ made of the sintered $Si_3N_4$ according to the invention.

The invention also relates to a process for producing the valves according to the invention, according to which the valves are selected using vibration analysis by frequency splitting of the resonant frequency peak $\geq 0.0125\%$. The other process steps are similar to the process according to the invention for the preparation of $Si_3N_4$, the compression being carried out in a mould corresponding to the valve to be produced.

It has now been found that, with the last-mentioned process, irrespective of the geometrical shape of the valve, defective components can be rapidly and definitively detected through frequency splitting of resonant frequency peaks.

This kind of selection is, however, also possible for components with a different geometrical shape.

In the process according to the invention, the valve to be tested is placed on the head side on three electrodynamic transducers, one transmitter and two receivers, in such a way that the valve is supported, at a distance of about 1–2 mm from the edge of the head, with an angular separation of the sensors equal to 120° each. By varying the frequency of the transmitter in the 0.1 to 2 MHz range, flexural vibrations of the shaft and flexural vibrations of the head plate are stimulated in the ceramic valve, and are recorded using the two vibration receivers.

Macroscopic defects, such as cracks, inclusions of components extraneous to the material or nonuniformities in terms of the thickness and/or Young's modulus are manifested by a clearly attributable resonance frequency split into 2 subsidiary natural vibrations, the frequency split increasing as the size of the fault increases.

The invention also relates to the use of the $Si_3N_4$ according to the invention and components produced therefrom in engine construction, especially as valves in reciprocating piston engines, in mechanical engineering in general, storage technology and in machine construction.

Engine parts produced therefrom are distinguished primarily by long life and high reliability. For example, $Si_3N_4$ engine valves on test rigs which were operated far beyond the conditions encountered in normal reciprocating piston engines, showed outstanding strength without failing.

The invention is further described in the following illustrative examples in which all parts and percentages are by weight unless otherwise indicated.

EXAMPLES

A variety of material compositions were produced in the same way by using different $Si_3N_4$ starting powders and sintering additives, and were characterized. The substantially chlorine-free LC12S (H.C. Starck, Germany) and the chlorine-containing Baysinid®ST (BAYER AG, Germany) were used as $Si_3N_4$ powders. These products have the following typical properties:

|  | LC12S | Baysinid ®ST |
|---|---|---|
| Specific surface, m²/g | 20 | >10 |
| O content, % by weight | 2.0 | 1.2–1.4 |
| C content, % by weight | 0.2 | <0.05 |
| Fe content ppm: | 60 | <50 |
| Al content ppm: | 300 | <20 |
| Ca content ppm: | 30 | <20 |
| Cl content pm: | <100 | 700–1500 |
| α-$Si_3N_4$ fraction, % relative to α and β | approx. 95 | approx. 96 |

The following were used as sintering additives: $Y_2O_3$ (obtainable under the trade name Grade C from the company H.C. Starck, Germany) and $Al_2O_3$ (obtainable under the trade name CT 3000 SG from the company Alcoa, Germany) and MgO (obtainable as MgO p.a. from the company Merck, Germany). The raw materials were placed in the $H_2O$ p.a. already present, to which a dispersion agent (KV 5088 from the company Zschimmer & Schwarz, Germany) was added, and were dispersed using high-speed stirrers. The viscosity was adjusted to 20 mPas, which corresponded to a solids content around 64%.

The batches were ground in a mechanically agitated ball mill until the simultaneously measured particle size distribution gave a grading of 90%<1 μm.

1% of Bayceram®4305, available from Bayer AG, Germany, was then added as binder and plasticizer, and grinding was continued for 5 minutes.

Slips prepared in this way were granulated using spray dryers, the conditions having been adjusted in each case in relation to the batch so that the proportion of granules <150 μm was as low as possible. Granules >150 μm were separated from the batch to be processed using a screen.

Shaped articles moulded from these granules at <2500 bar were heated to temperatures of up to at most 650° C. and were sintered as in DE-A 4 233 602 without embedding in inert powder in graphite containers at 1800° C.±50° C. in an $N_2$ atmosphere.

The material properties are reported in the table below. The flexural strength and the Weibull modulus were determined according to DIN 51 110 and the subcritical crack growth parameters were determined according to European draft standard ENV 843-3.

The following abbreviations have been used in the table below:

"TGV-Ans." corresponds to the proportion of powder particles in the suspension after grinding which are smaller than 1 μm (%<1 μm). "GGV" the granule size distribution characterized by the mean of the distribution D50 in μm. The sintered density is the density of the sintered article, determined using the buoyancy method in $H_2O$, the "O content" and "Cl content" the oxygen (O) and chlorine (Cl) contents analysed after sintering in the sintered article. From the O content, after subtracting the known oxygen levels which are introduced by the sintering additives, the oxygen level which was introduced through the $Si_3N_4$ powder after the preparation step was calculated. With the assumption that this is present in the form of $SiO_2$, the total concentration of the oxide components in % by weight was calculated by adding this calculated $SiO_2$ content in the sintered material and the concentration of the sintering additives added. This total concentration is converted according to the explanations above into volume fractions of secondary phase and crystalline $Si_3N_4$. The important secondary phase concentration in volume % determined in this way is given in the column "Sec.-pha." in the table.

TABLE 2

Material variations for Example 1 and resulting material properties

| Batch No. | Batch composition % by weight | TGV-Ans. % <1 μm | GGV D-50 μm | Sintering cond. T, ° C./t, h/p-N2, bar | Sintered density g/cm³ | O content % by weight | Sec.-pha. Vol. % | Cl content ppm | Flexural strength MPa | Weibull-modulus | n value | According to the invention yes/no |
|---|---|---|---|---|---|---|---|---|---|---|---|---|
| 0 | LCl2s + 5$Y_2O_3$ + 5$Al_2O_3$ | 91.0 | 75 | 1800/2/100 | 3.23 | 5.7 | 14.2 | 70 | 895 | 22 | 27 | no |
| 1 | BST + 5$Y_2O_3$ + 5$Al_2O_3$ + 1MgO | 92.0 | 75 | 1775/2/10 | 3.24 | 5.4 | 12.9 | 390 | 920 | 22 | 60 | yes |
| 2 | BST + 8$Y_2O_3$ + 4$Al_2O_3$ | 91.5 | 80 | 1825/2.5/10 | 3.28 | 3.8 | 13.9 | 320 | 942 | 28 | 71 | yes |

BST is Baysinid ® ST

The effect according to the invention of Cl contents on the subcritical crack growth parameter n can be seen clearly from these examples Although the present invention has been described in detail with reference to certain preferred versions thereof, other variations are possible. Therefore, the spirit and scope of the appended claims should not be limited to the description of the versions contained therein.

What is claimed is:

1. A sintered $Si_3N_4$ consisting essentially of a chlorine content of 100 to 500 ppm, wherein the sintered $Si_3N_4$ material has a subcritical crack growth parameter in that is greater than or equal to 50, a mean flexural strength at room temperature that is greater than or equal to 850 MPa and a Weibull modulus that is greater than or equal to 18.

2. The sintered $Si_3N_4$ material according to claim 1, wherein the material further comprises a sintering additive selected from the group consisting of, alkaline earth metals, $Sc_2O_3$, $Y_2O_3$, rare earth oxides, $TiO_2$, $ZrO_2$, $HfO_2$, $B_2O_3$ and $Al_2O_3$, wherein the sintering additive component forms a secondary phase concentration in the sintered $Si_3N_4$ material of 7.5 to 20 vol. % in addition to a component selected from the group consisting of crystalline $Si_3N_4$ and $Si_3N_4$ mixed crystals.

3. A process for preparing the sintered $Si_3N_4$ material consisting essentially of a chlorine content of 100 to 500 ppm, wherein the sintered $Si_3N_4$ material has a subcritical crack growth parameter n that is greater than or equal to 50, a mean flexural strength at room temperature that is greater than or equal to 850 MPa and a Weibull modulus that is greater than or equal to 18, the process comprising
- (A) dispersing $Si_3N_4$ powder in water together with at least one sintering additive component, and mixing with the dispersed powder, organic processing aids to form an aqueous slip, wherein the $Si_3N_4$ powder has a chlorine content in an amount that ranges from 500 to 1500 ppm, and optionally a metal chloride;
- (B) grinding the aqueous slip to a fineness in which 90% of the slip is less than 1 μm,
- (C) subsequently drying the aqueous slip so that $Si_3N_4$ granules have a moisture content of between 1 and 4% by weight and an average granule size that ranges from 40 to 80 μm,
- (D) subsequently compressing and sintering $Si_3N_4$ granules after the organic processing aids have been baked under an $N_2$ pressure that ranges from 1 to 10 bar.

4. The process according to claim 3, wherein the compression is carried out at a pressure that is less than or equal to 2500 bar, the organic processing aids and the moisture are baked in air, inert gas or vacuum at a temperature that is less than or equal to 650° and the sintering is carried out at a temperature that is less than or equal to 2000° C.

* * * * *